United States Patent [19]
Parsley

[11] Patent Number: 4,713,742
[45] Date of Patent: Dec. 15, 1987

[54] DUAL-INDUCTOR BUCK SWITCHING CONVERTER

[75] Inventor: David W. Parsley, Draper, Utah

[73] Assignee: Sperry Corporation, Blue Bell, Pa.

[21] Appl. No.: 917,126

[22] Filed: Oct. 9, 1986

[51] Int. Cl.$^4$ ............................................. H02M 3/10
[52] U.S. Cl. ................................... 363/124; 323/272; 323/350; 323/351
[58] Field of Search ...................... 363/16, 20, 39, 65, 363/124; 323/272, 344, 345, 350, 351

[56] References Cited

U.S. PATENT DOCUMENTS

| | | | |
|---|---|---|---|
| 3,093,790 | 6/1963 | Ehret | 323/22 |
| 3,181,051 | 4/1965 | Marshall | 318/341 |
| 3,325,715 | 6/1967 | Jacoby | 318/293 |
| 3,414,795 | 12/1968 | Weiser | 320/9 |
| 3,418,558 | 12/1968 | Morgan et al. | 363/124 |
| 3,457,487 | 7/1969 | Cooper | 318/332 |
| 3,487,234 | 12/1969 | Morgan | 307/252 |
| 3,496,444 | 2/1970 | King et al. | 321/2 |
| 3,588,664 | 6/1971 | Akamatsu | 363/124 |
| 3,628,047 | 12/1971 | Cromin et al. | 307/246 |
| 4,034,281 | 7/1977 | Morita et al. | 323/17 |
| 4,095,166 | 6/1978 | Shibata et al. | 363/124 |
| 4,186,437 | 1/1980 | Cuk | 363/65 |
| 4,408,268 | 10/1983 | Peters et al. | 363/124 |

OTHER PUBLICATIONS

Severns, R. P., Bloom G., Modern DC-to-DC Switchmode Power Converter Circuits.
Middlebrook R. D., Design Considerations and Noise Reduction in Switching Converters.
Buck-Boost DC Voltage Regulator, NASA Tech. Brief, Brief 70-10005, Jun. 1970.
Designing a Regulator's LC Input Filter: 'Ripple' Method Prevents Oscillation Woes, Dan Sheehan, Electronic Design, Aug. 2, 1979.
Improved Ripple Rejection in a PWM, NASA Tech. Briefs, Summer 1979.
Gross T., A Little Understanding Improves Switching-Inductor Designs, EDN, 6/20/79.
Davis S., Power Supplies for Computers and Peripherals, Computer Design, Jul. 1979.
Chetty P. R. K., Closed Loops-on Track for Testing Switchers, Electronic Design, Jul. 7, 1983.
Dixon, L. H. Jr., Pulse Width Modulator Control Methods with Complementary Optimization, Powerconversion International, Jan. 1982.

Primary Examiner—Peter S. Wong
Assistant Examiner—Jeffrey Sterrett
Attorney, Agent, or Firm—Glenn W. Bowen; Laurence J. Marhoefer

[57] ABSTRACT

A DC-to-DC power converter is constructed by coupling two parallel-connected inductors in series with a DC input power source. A communication switch is connected in series of each of the inductors. One terminal of each of these switches is connected to one terminal of the input power supply, and the other terminal of both of the switches is connected to the common side of the power supply. The commutation switches are controlled so that they have a switching duty cycle that is greater than 50%. Thus, whenever one of the switches turns off or on, the other switch will remain engaged during this switching time. As a result of this construction, the sum of the currents that flow through the inductors provides an output current to the load which has a greatly reduced ripple and a more constant output current. Also, harmonics of lesser amplitude and higher frequency content are drawn from lines, reducing the size of filter components required to reduce these input-current harmonics.

1 Claim, 5 Drawing Figures

DUAL-INDUCTOR BUCK SWITCHING CONVERTER

BACKGROUND OF THE INVENTION

The buck voltage converter is a conventional type of converter which employs an inductor series with a switching regulator where simplicity, high efficiency and the use of miniature output filter components are desirable advantages. The inductor is coupled to the load resistor, and an output filter capacitor is coupled across the load resistor. In addition, at the opposite end of the inductor, a diode is connected in shunt across the capacitor and the load resistor to permit continuous current conduction through the inductor when power switch is turned-off so that the diode receives the current generated by the collapse of the electromagnetic field of the inductor.

In this type of circuit, the steady state output voltage is directly dependent upon the input voltage and the duty cycle, and is independent of the load current. Although load regulation is inherently good, a higher than desirable ripple occurs, however, which appears in the output current, due to the switching frequency harmonics of the current that is drawn from the input line. Also, when the load changes, this type of circuit tends to have a relatively slow response to a change in the load.

FIGS. 1 and 2 illustrate the operation of a prior art circuit of the type generally described above. The DC input power source 12 is connected to the terminal 14 of the switch 18, which may be any type of suitable switch including a transistor switch, which is used to complete the path between the terminal 14 and the cathode of the diode 20 when the switch is closed. The anode of the diode 20 is connected to the common side of the input power source 12.

An iron-cored inductor 22 is connected in series with the switch 13 between the cathode of the diode 20 and plate of the capacitor 24. The other plate of the capacitor 24 is connected to the anode of the diode 20. A load resistor 26 is coupled in parallel across the capacitor 24. The output current $I_{OUT}$, which flows through the inductor 22, is illustrated by the waveform of FIG. 2.

The present invention, by using two inductors in a dual-inductor, buck-switching topology, with two commutating switches that are switched at a duty cycle greater than 50%, greatly reduces switching harmonics, and thereby supplies an output load current that has much less ripple than the Prior Art supply. In addition, the two inductors allow the circuit to respond more quickly to large load transients.

BRIEF DESCRIPTION OF THE DRAWINGS

The present invention is described by reference to the drawings.

TECHNICAL DESCRIPTION OF THE INVENTION

Figure 1:
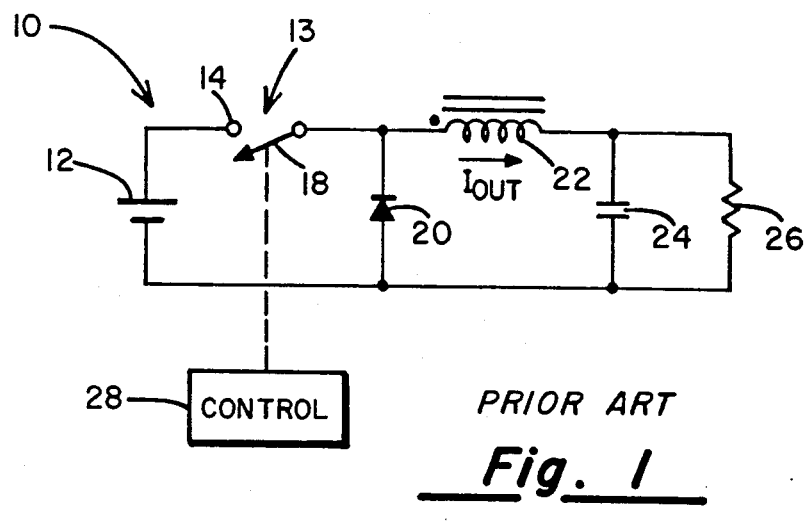
FIG. 1 is a schematic of a prior art switching, buck converter.
Figure 2:
FIG. 2 is a waveform which shows the load current that flows to the output load in the circuit of FIG. 1.
Figure 3:
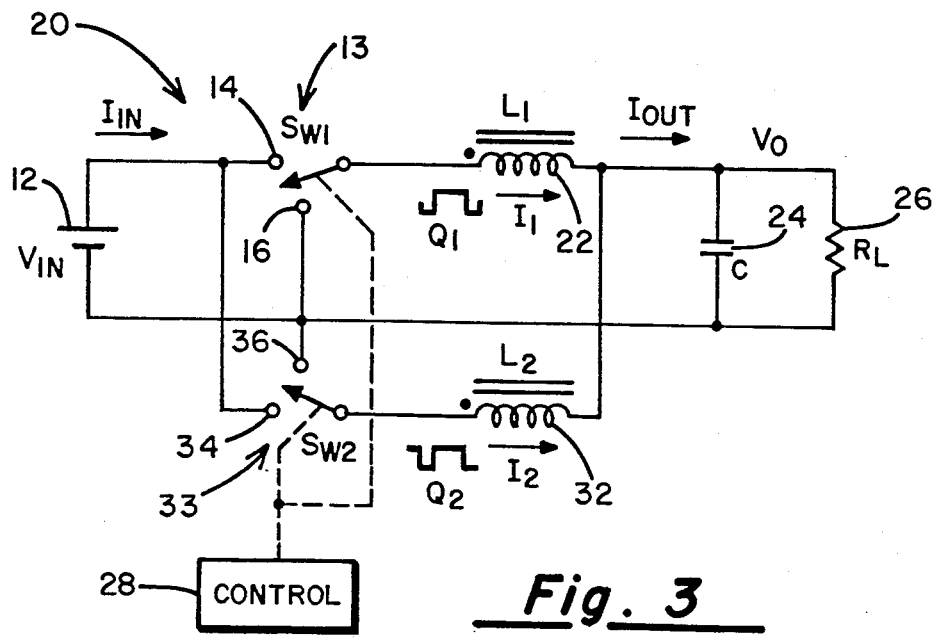
FIG. 3 is a schematic diagram of an embodiment of the present invention.

The present invention is constructed with components similar to those of FIG. 1, and thus, where the elements are identical, the circuit 20 of the present invention will be given identical numbers to those of FIG. 1. Thus, the circuit of FIG. 3 has a DC input power source 12, an output filter capacitor 24 and a load resistor 26. It is also provided with a first switch 13 which has one terminal 14 connected to one side of the input power supply and a second terminal 16 connected to the common side of the input power source 12.

The switch 13 is connected to an inductor 22, however, it is noted that in this circuit that diode 20 may be removed. In place of the diode 20 there is a second switch 33 which has a terminal 34 connected to the terminal 14, and a terminal 36 connected to the terminal 16. A second inductor 32 is connected in parallel with the inductor 22, and is connected in series with the switch 33. The inductors 22 and 32 are wound in the same direction as indicated by the dot on their left-hand ends. A conventional control circuit 28 controls the operation of both of the switches 13 and 33 to provide the switching waveforms of FIGS. 4 and 5.

Figure 4:
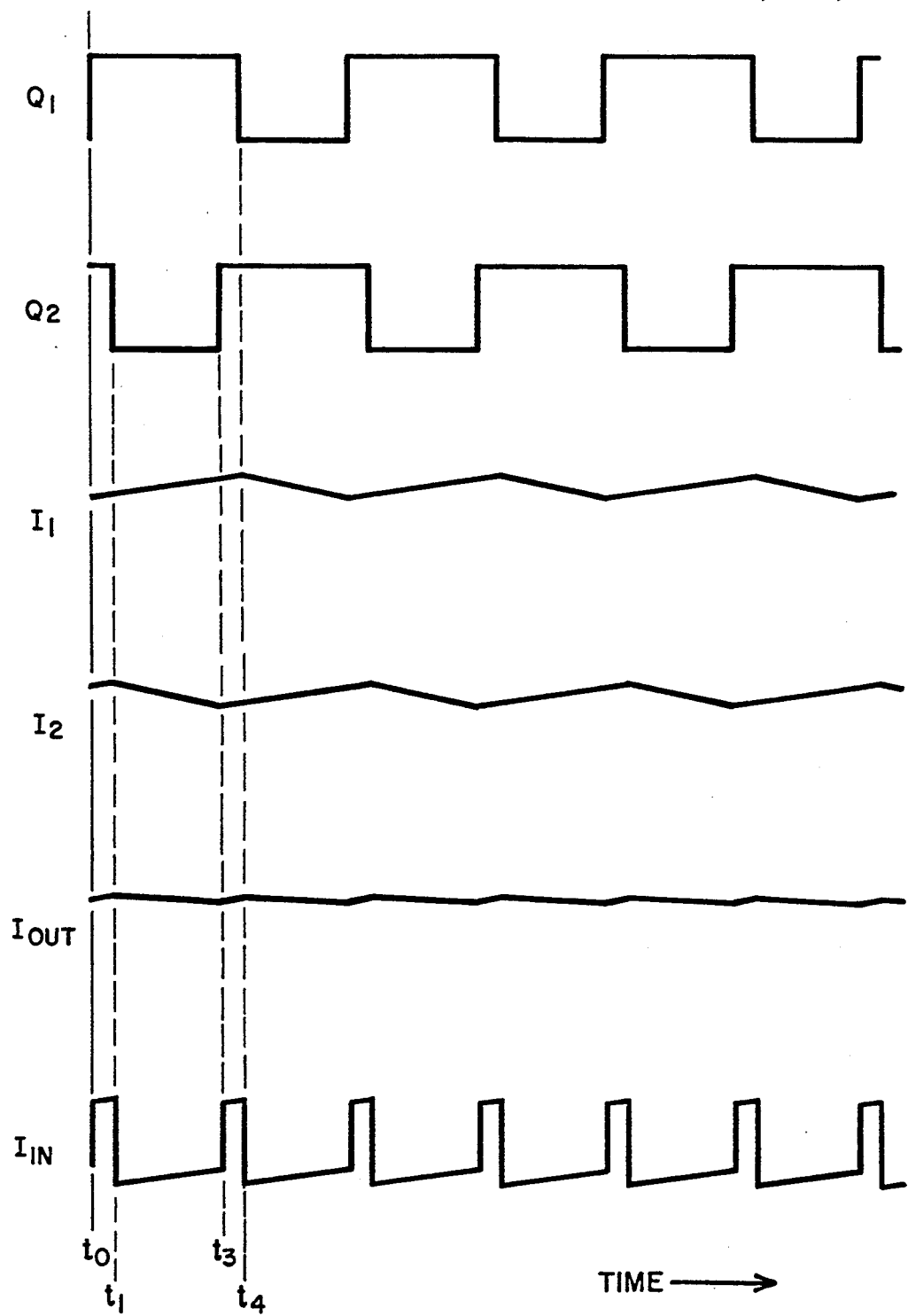
FIG. 4 is a waveform representation that shows the switching cycle of the two commutating switches, the currents flowing through the two inductors into the load and the input current when continuous current is flowing through the inductors.

As shown in FIG. 4, a waveform $Q_1$ indicates the opening and closing of the switch 13, while a waveform $Q_2$ indicates the opening and the closing of the switch 33. Thus, it is seen, proceeding from the left, that both switches are initially on at $T_0$, but then the switch 33 turns off at $T_1$ leaving only switch 13 on. At a subsequent later time $T_3$ the switch 33 again goes on before the switch 13 is opened. Switch 13 is then opened at the time $T_4$.

During the time that switch 13 is closed and switch 33 is opened, the current $I_1$ through the inductor 22 will be increasing in magnitude from time $T_1$ to $T_3$ while the current $I_2$ through the inductor 32 will be decreasing in magnitude because the field is collapsing in the inductor 32 at this time. The input power source 12 supplies the input current $I_{IN}$ through the switch 13 to the inductor 22 shown in FIGS. 4 and 5. The summation of the currents $I_1$ and $I_2$ provide the output current $I_{out}$, which flows through the filter capacitor 24 and the load resistor 26.

The input current $I_{IN}$ over the time period $T_0$ to $T_4$ which is drawn from the power supply 12 is shown as a series of high narrow time pulses interspersed between longer lower level waveforms which gradually increase until such time, that there is a switch between the low level and high level. It is seen, from the depicted waveforms of FIGS. 4 and 5 that by use of the present invention that switching harmonics are greatly reduced from that of a buck-switching converter and an output load current which has a greatly decreased ripple is provided.

Figure 5:
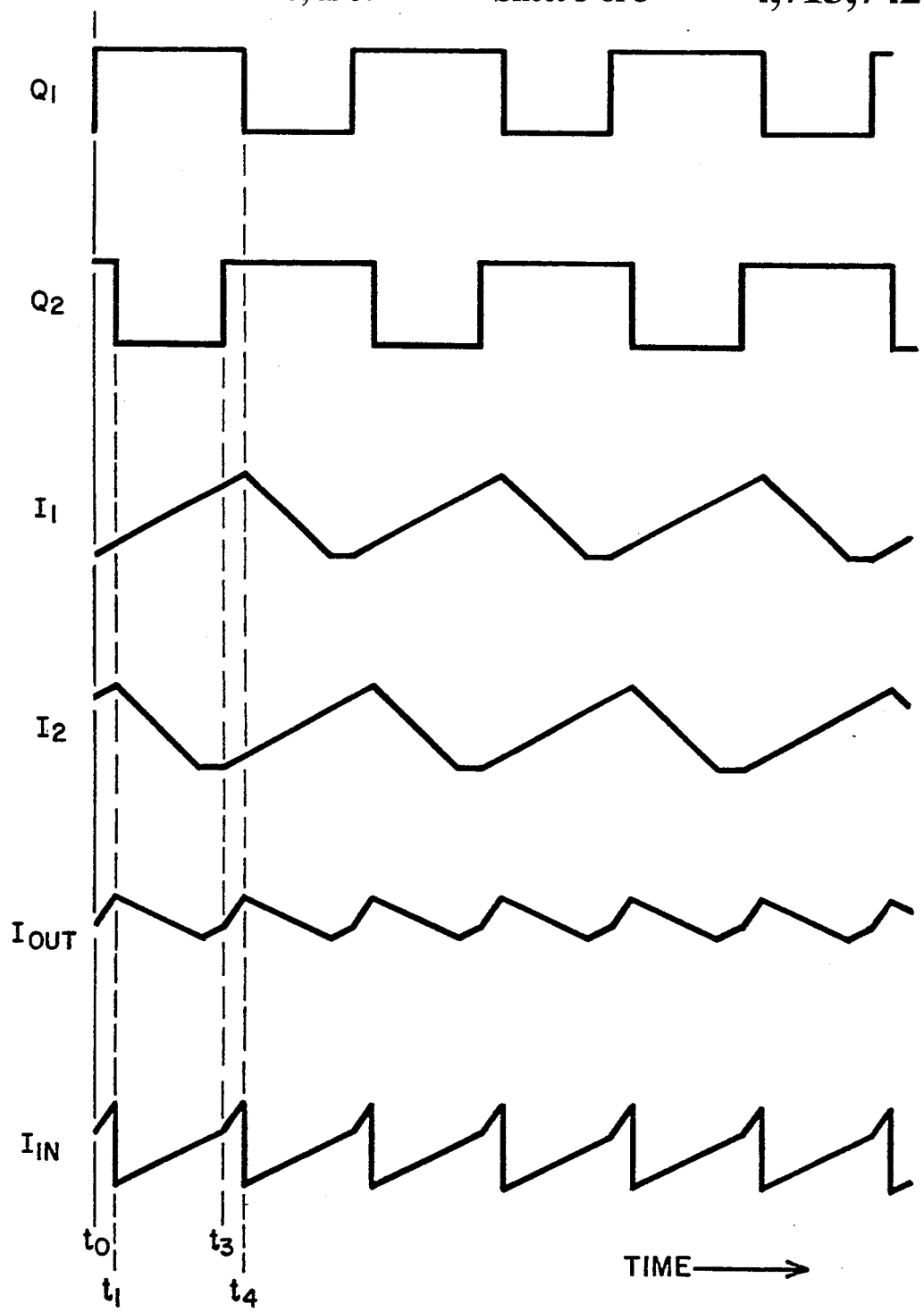
FIG. 5 is a waveform representation of the present invention when the current flowing through the two inductors is not continuous.

FIG. 5 shows that even when the load conditions are such that the currents $I_1$ and $I_2$ through the inductors are allowed to reach 0 during the switching cycle, the output load current will have a generally sawtooth waveform but it will not reach zero. It will, however, still have a greatly decreased ripple over the Prior Art type of circuit.

I claim:

1. A DC-to-DC power converer for regulating the voltage supplied from a DC input power sourced from first and second input terminals to an output load having first and second output terminals, regulating means comprising first and second switch means each constructed to switch between said first input terminal and said second input terminal so as to alternately complete and open first and second conduction paths to said first output terminal when so switched, and first and second inductive means each coupled in series in one of said conduction paths with one of said first and second switch means and to said first output terminal, each of said inductive means and its associated series-connected switch means being connected in parallel with the other of said inductive means and its associated series-connected switch means, and being wound with the same polarity sense, and control means coupled to said first and second switch means so that both the said switch means are on more than 50% of the time, and also so that after one of said switch means is switched off from said first input terminal the other of said switch means will be switched onto said first input terminal wherein current that flows in said first inductive means increases after said first switch means is switched to said first terminal and the current that flows in said second inductive means decreases after said second switch means is switched to said first terminal.

* * * * *